3,694,185
PRODUCTION OF METAL POWDER BY DIRECT
REDUCTION FROM AQUEOUS SOLUTIONS
Wasyl Kunda, Fort Saskatchewan, Alberta, and Finlay
Campbell, Edmonton, Alberta, Canada, assignors to
Sherritt Gordon Mines Limited, Toronto, Ontario, Canada
Filed May 28, 1971, Ser. No. 147,888
Int. Cl. B22f 9/00
U.S. Cl. 75—.5 A                                5 Claims

ABSTRACT OF THE DISCLOSURE

In the production of copper, cobalt and nickel by gas reduction from solutions or slurries in which the metal is present as a salt, a very small amount, e.g. between 0.01 and 0.005 gram per litre, of ethylene maleic anhydride is provided in the reduction charge to control the physical characteristics, particularly surface texture, of the powder product.

---

Figure 1:
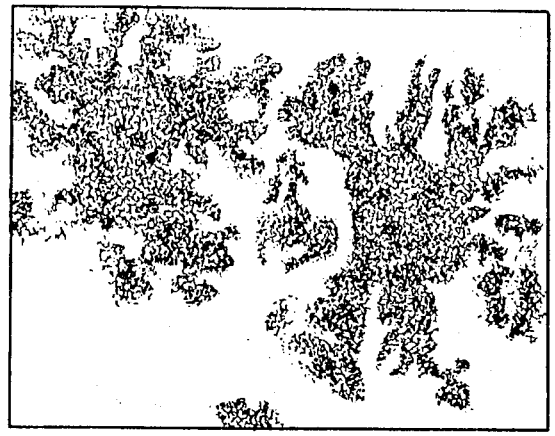
Figure 2:
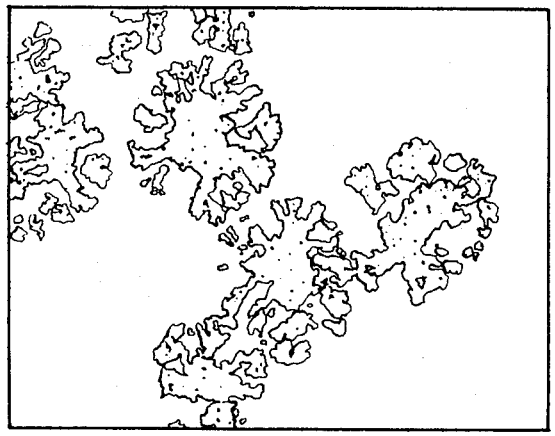

This invention relates to the production of a metal as metal powder from solutions or slurries in which the metal of interest is present as a metal compound by reacting the solution or slurry with a reducing gas at elevated temperature and pressure. More particularly, it is concerned with improvements in such processes whereby the surface texture of elemental nickel, cobalt or copper powder produced is controlled through use of an organic addition agent selected from the group consisting of ethylene maleic anhydride polymers.

Processes are known and in commercial use by which nickel, cobalt and copper as well as other metals having an oxidation-reduction potential of between that of silver and cadmium inclusive are precipitated in the form of finely divided elemental metal particles of random shape and size from solutions or slurries in which the metal is present as a salt by reacting the solution or slurry with a sulphur-free reducing gas at elevated temperature and pressure. This method of producing metal by gas reduction from solutions and slurries in which the desired metal are present as compounds has been subjected to exhaustive investigation leading to the discovery of operating conditions, catalysts and promoters by means of which optimum results can be obtained in the large scale commercial operation of the process. However, problems remain in the production of metals from solutions or slurries by gas reduction, particularly where it is desired to produce powders with specific physical properties which are necessary or desired for certain powder metallurgical applications. For example, for powder metallurgical applications, such as that described in Canadian Pat. No. 736,885 issued June 21, 1966, for example, in which nickel powder is formed into a green compact which is subsequently sintered and mechanically worked to produce wrought nickel sheet, it is important that the powder have physical properties, such as irregular particle shape, which ensure that compacts with sufficient green strength can be formed to permit handling of the compacts in processing prior to the sintering operations in which the metal particles become metallurgically bonded.

In the production of metal powders by the prior art gas reduction procedures, powders obtained do not always have the physical properties required for compactibility. This is particularly the case where the so-called "densification" reduction procedure is used. In this procedure, which is generally necessary for economic powder production, powders are produced by carrying out a series of batch reductions without discharging the powder product after each such reduction. That is, powder particles precipitated in any one reduction are left in the reaction vessel until a large number, e.g. up to 50 or more, separate batches of feed have been reduced. Powders produced by densification procedures are generally uniformly sized and have an equi-axed or somewhat blocky particles shape and a relatively high apparent density which make them unsuitable for powder compacting applications where good green strength is required.

The principal object of the present invention, therefore, is to provide a method for controlling the physical properties of metal powders produced by direct reduction from solutions or slurries. A further object of this invention is to provide a process which permits the economic production of copper, nickel and cobalt powder particles having an irregular surface texture which renders them ideal for use in the powder metallurgical applications involving powder compaction. A further object of the invention is to provide copper, nickel and cobalt powders of highly irregular particle shape.

These and other objects of the invention can be attained by providing in the solution or slurry subjected to the reducing reaction a finite amount of an addition agent consisting of an ethylene maleic anhydride polymer having the formula:

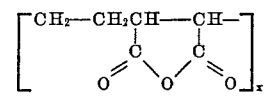

where $x$ is between 11 and 21. The addition agent can be used alone or it may be used with other additives such as acrylic and polyacrylic acids, polymers and copolymers, derivatives and salts of acrylic and polyacrylic acids, compounds which contain acrylic and polyacrylic acids and polymers, copolymers, derivatives and salts of acrylic and polyacrylic acids, lignin and derivatives of lignin as described in Canadian Pat. No. 580,508 issued July 28, 1959.

The method of the invention is independent of the source of the solution or slurry which contains salts of the metal or metals of interest. Usually, such solutions or slurries will be derived from the conventional sulphuric acid or ammonium salt leaching methods and will have been suitably purified to eliminate any undesired impurities. The method of the present invention may be used in conjunction with any of the specific processes which are known for the production of metals from solutions and slurries by gas reduction. Such methods are described in detail in numerous patents including, for example, Canadian Pats. Nos. 774,036, 584,303, 601,701, 520,273, 520,272, 520,266, 562,308, 561,951, 553,400, 553,399, 553,312, 520,260 and 514,814.

Generally reduction and precipitation of nickel, copper and cobalt from systems in which they are present singly or together as dissolved salts or partly dissolved salts and partly as solid salts preferably is conducted in an ammoniacal system such as ammonium sulphate or ammonium carbonate systems or mixed sulphate-carbonate systems at elevated temperature of the order of from about 200° F. to about 500° F. and preferably within the narrower range of about 250° F. to about 400° F. and under a positive partial pressure of reducing gas such as hydrogen within the range of from about 100 to 600 pounds per square inch and preferably within the narrower range of from about 200 to about 500 pounds per square inch. The conditions of operation such as the mole ratio of ammonia to the metal of interest, hydrogen ion concentration, temperature, partial pressure of hydrogen and total pressure by which optimum reduction is obtained vary for each particular metal to be reduced and precipitated. The amount of metal in the system is not critical although it usually is preferred to employ a minimum concentration above that at which the process can be conducted as an economically practical operation. Normal concentrations of nickel and cobalt for the solution systems is between 30 and 80 grams per litre of solution and for the slurry system between about 50 and 150 grams per litre. Copper concentrations preferably are about 60 to 150 grams per litre for either solution or slurry systems.

We have found that control over the physical characteristics of the precipitated metal powders can be obtained when as little as 0.005 gram per litre of ethylene maleic anhydride polymer is provided in the system subjected to the reduction reaction. In most cases, optimum results are obtained with additions of between 0.01 and 0.005 g.p.l. for each reduction cycle with the amount being increased towards the higher end of this range as the number of reduction cycles (densifications) increases. Greater amounts, for example, up to 0.5 gram per litre or more, can be provided if desired. However, carbon contained in the added compound may contaminate the purity of the desired metal product and although it can be removed in subsequent treatment of the metal, it is generally not desired to use an amount in excess of that required to obtain optimum results.

In the following examples which illustrate the results which are obtainable by the use of the present invention, some compounds are identified by trade names under which the substances are available. Of the substances employed in the following examples, "Separan" is identified by Dow Chemical Company as high molecular weight acrylamide polymer hydrolytes having from 0.8% to about 10% of the amide groups of the polymer replaced by carboxyl groups and characterized by a viscosity of at least 4 centipoises for an aqueous 0.5% by weight solution of the polymer hydrolyte. "EMA-11" and "EMA-21" are designations for ethylene maleic anhydride polymer produced by Monsanto Chemical Company.

EXAMPLE 1

This example illustrates the effect of the addition agents of the present invention in the production of nickel powder from an aqueous ammoniacal nickel sulphate system. For purposes of comparison, two tests were conducted using the same feed solution: Reduction feed solution for nucleation was derived from leaching of nickel powder under oxidizing conditions with ammoniacal ammonium sulphate solution. The $Ni/NH_3$ molar ratio of the solution was 2:1 and the initial $(NH_4)_2SO_4$ concentration was 100 g.p.l. For subsequent densifications refinery solution containing 45 g.p.l. nickel, 28 g.p.l. $NH_3$ and 350 g.p.l. $(NH_4)_2SO_4$ was used. Reduction was carried out at a temperature of 390° F.–400° F. under a total pressure of 400 p.s.i.g. The catalyst for initiation of the first reduction cycle was 0.5 g.p.l. ferrous iron.

In Test 1, no addition agent was used and a series of 50 batch reductions (densifications) were conducted. That is, nickel particles precipitated in any one reduction were left in the reduction vessel until 50 charges of solution had been treated. In Test 2, 40 densifications were conducted. Additives were as follows:

D–1 (first densification) to D–15—Separan 0.00025 g.p.l.+EMA–11 0.0066 g.p.l., D–16 to D–26—Separan 0.00038 g.p.l.+EMA–11 0.1 g.p.l., D–27 to D–40 EMA–11 only—0.0066 g.p.l.

In Test 3, 50 densifications were conducted. Additives were as follows:

D–1 to D–25—Separan only 0.0004 g.p.l., D–26 to D–50 EMA–11 only—0.0066 g.p.l.

In each case, samples were taken periodically and subjected to screen analyses and apparent density determinations. The results of Test 1 are shown in Table I, the results of Test 2 in Table II and the results of Test 3 in Table III.

TABLE I

| Densification (reduction cycle number) | Apparent density, gm./cm.³ | Powder product screen analysis, percent | | | | | |
|---|---|---|---|---|---|---|---|
| | | +100 | −100 +150 | −150 +200 | −200 +250 | −250 +325 | −325 |
| 5 | 3.0 | Not determined | | | | | |
| 10 | 3.8 | 0.1 | 1.3 | 16.0 | 21.7 | 37.4 | 23.0 |
| 15 | 4.1 | Tr | 2.3 | 21.8 | 26.4 | 36.6 | 12.8 |
| 20 | 4.1 | Not determined | | | | | |
| 25 | 4.1 | .3 | 4.5 | 31.2 | 27.2 | 30.5 | 6.9 |
| 30 | 4.1 | .4 | 5.7 | 36.1 | 31.3 | 22.4 | 4.1 |
| 35 | 4.3 | 1.5 | 14.5 | 59.0 | 20.0 | 4.0 | 1.0 |
| 40 | 4.3 | 3.0 | 30.0 | 60.5 | 5.5 | 1.0 | Tr |
| 45 | 4.4 | 5.1 | 46.6 | 47.8 | .4 | .2 | Tr |
| 50 | 4.4 | 12.0 | 67.5 | 20.4 | .1 | Tr | |

TABLE II

| Densification (Reduction cycle number) | Apparent density, gm./cm.³ | Powder product screen analysis, percent | | | | | |
|---|---|---|---|---|---|---|---|
| | | +100 | −100 +150 | −150 +200 | −200 +250 | −250 +325 | −325 |
| 5 | 2.6 | | | | | | |
| 10 | 2.8 | | | | | | |
| 15 | 2.8 | .6 | 1.1 | 1.7 | 1.6 | 24.2 | 70.8 |
| 20 | 2.7 | .5 | 1.0 | 2.0 | 3.5 | 22.5 | 70.5 |
| 25 | 2.7 | .6 | 1.4 | 4.2 | 9.8 | 61.0 | 23.0 |
| 30 | 2.8 | 1.0 | 1.2 | 8.4 | 15.1 | 57.6 | 17.4 |
| 35 | 2.9 | 1.0 | 1.0 | 16.1 | 25.2 | 45.0 | 11.1 |
| 40 | 3.0 | .5 | 1.0 | 29.0 | 34.5 | 25.5 | 8.5 |

TABLE III

| Densification (Reduction cycle number) | Apparent density, gm./cm.³ | Powder product screen analysis, percent | | | | | |
|---|---|---|---|---|---|---|---|
| | | +100 | −100 +150 | −150 +200 | −200 +250 | −250 +325 | −325 |
| 6 | 2.6 | | | | | | |
| 11 | 3.3 | | | | | | |
| 15 | 3.5 | | .1 | .4 | .4 | 1.9 | 97.2 |
| 20 | 3.7 | .1 | .3 | .5 | .2 | 18.9 | 80.0 |
| 25 | 3.9 | .1 | .3 | .4 | .6 | 25.9 | 72.7 |
| 30 | 3.5 | | | | | | |
| 35 | 3.0 | .5 | 1.5 | 3.5 | 8.0 | 71.0 | 15.5 |
| 40 | 3.0 | .2 | .9 | 9.3 | 18.5 | 68.9 | 2.2 |
| 45 | 3.1 | 1.4 | 1.8 | 37.3 | 37.1 | 20.7 | 1.5 |
| 50 | 2.7 | 1.5 | 6.2 | 85.2 | 6.0 | .1 | 1.1 |

The results in Tables I, II and III show that the addition of a small amount of low molecular weight ethylene maleic anhydride polymer has the effect of controlling the apparent density of the powder product such that the apparent density remains relatively low and constant in comparison to that of powder produced from the same solution by direct reduction under the same conditions except for the presence of the addition agent. The results also show less growth in particle size with successive reductions where EMA–11 is added with Separan (Table II). The results in Table III show that where Separan alone was added for the early densifications (D–1 to D–25) the apparent density gradually increased and then gradually decreased again with additions of EMA only in the later densifications (D–26 to D–50).

It was also observed that average reduction time where no additive was present was about 25–30 minutes in Test 1 whereas this was only about 10–12 minutes in Tests 2 and 3 where EMA was added. This demonstrates that the addition agent of the invention also functions as a reduction catalyst by substantially decreasing the time required for the reduction reaction in each reduction cycle.

EXAMPLE 2

In this example, the reduction feed solution was a nickel amine sulphate solution derived from leaching nickel sulphide concentrate under oxidizing conditions with ammoniacal ammonium sulphate solution. The solution contained 45 grams per litre of nickel, 350 grams per litre of ammonium sulphate and had a free ammonia to nickel molar ratio of 2:1. Nickel powder was produced in series of 25 batch reductions or "densifications." Reduction was conducted at 400° F. under a total pressure of 400 p.s.i.g. 0.05 g.p.l. EMA–11 was added for reduction cycles D–1 to D–10 and 0.033 g.p.l. for reduction cycles D–11 to D–25. The apparent density and screen analysis of the powder product is shown in Table IV.

TABLE IV

| Densification (reduction cycle number) | Apparent density, gm./cm.³ | Powder product screen analysis | | | | |
|---|---|---|---|---|---|---|
| | | −100 +150 | −150 +200 | −200 +250 | −250 +325 | −325 |
| D-5 | 2.10 | 11.5 | 21.0 | 10.5 | 29.0 | 28.0 |
| D-10 | 2.50 | 7.2 | 20.7 | 12.2 | 30.2 | 29.7 |
| D-15 | 2.25 | 13.6 | 41.2 | 13.2 | 20.4 | 11.6 |
| D-20 | 2.26 | 18.5 | 32.1 | 7.9 | 12.4 | 29.1 |
| D-25 | 2.84 | 27.4 | 27.4 | 8.6 | 10.1 | 12.7 |

The results show a relatively constant apparent density product of D-10 through D-25 and somewhat coarser particle size than that produced in Test 2 of Example 1 where Separan was added along with the EMA. The distinctive physical character of the powder produced in Test 3 is shown in FIGS. 1 (magnification ×650) and 2 (magnification ×250) which drawings are based directly on photomicrographs of a powder sample and sectioned powder particles. The irregular-shaped random-branched surface texture of the particles is readily observable.

Also, for purposes of comparison, samples of the D-25 powder of Table IV and a D-25 powder produced under the same conditions but without the addition of EMA were formed into green compacts using MPA 13-51T method. The UTS of the compacts was 780 p.s.i. for the Table IV powder and 280 p.s.i. for the powder produced without EMA addition.

EXAMPLE 3

This example illustrates the effect of using the addition of the present invention in the reduction of copper from copper amine carbonate solution. The solution contained 136 g.p.l. copper, 14 g.p.l. zinc and 96 g.p.l. $CO_2$ and 128 g.p.l. $NH_3$. Reductions were conducted at 190° C. under 35 kg./cm.² hydrogen pressure. 0.05 g.p.l. EMA-21 was added to the reduction system in Test A and no additive in Test B. The results are shown in Table V.

TABLE V

| Test | Apparent density, gm./cm.³ | Powder product screen analysis | | | | |
|---|---|---|---|---|---|---|
| | | −100 +150 | −150 +200 | −200 +250 | −250 +325 | −325 |
| A (with additive) | 1.3 | 1 | 3 | 5 | 21 | 35 | 35 |
| B (without additive) | 2.1 | 47 | 29 | 9 | 3 | 2 | 9 |

Microscopic examination showed powder from Test A to be composed of highly irregular shaped particles while Test B powder was composed of blocky generally equiaxed particles.

Green strength of a compact formed from powder A by compacting at 30,000 p.s.i. using MPA 13-51T method was 5950 p.s.i. and for powder B green strength was 4750 p.s.i.

What we claim as new and desire to protect by Letters Patent of the United States is:

1. In a process of producing substantially oxide free non-ferrous metal powder of a metal having an oxidation reduction potential between cadmium and silver inclusive, said method including the step of reacting an aqueous system which contains a salt of at least one of said metals with a reducing gas at elevated temperature and pressure, the improvement which comprises providing in said system a finite amount of an addition agent comprised of an ethylene maleic anhydride polymer.

2. The process according to claim 1 in which the metal is a member of the group consisting of copper, cobalt and nickel.

3. The process according to claim 2 in which the addition agent is present in the system subjected to treatment in amount between 0.01 and 0.005 gram per litre.

4. The process according to claim 2 in which a plurality of successive reductions are carried out on fresh charges without removal of powder from the reduction vessel after each such reduction.

5. The process according to claim 4 in which said additive is provided in the reduction system only during the later of said successive reductions and a second addition agent is provided during the earlier reductions, said second addition agent being selected from the group consisting of acrylic and polyacrylic acids, polymers, copolymers, derivatives and salts of acrylic and polyacrylic acids, compounds which contain acrylic and polyacrylic acids and polymers, copolymers, derivatives and salts of acrylic and polyacrylic acids, lignin and derivatives of lignin.

References Cited

UNITED STATES PATENTS 2,853,380    9/1958    Evans et al. _____ 75—0.5 A

WAYLAND W. STALLARD, Primary Examiner

U.S. Cl. X.R.

75—0.5 AA, 0.5 AB, 117, 118, 119, 120